3,327,141
THERMOELECTRONIC ENERGY CONVERTERS FOR NUCLEAR REACTORS

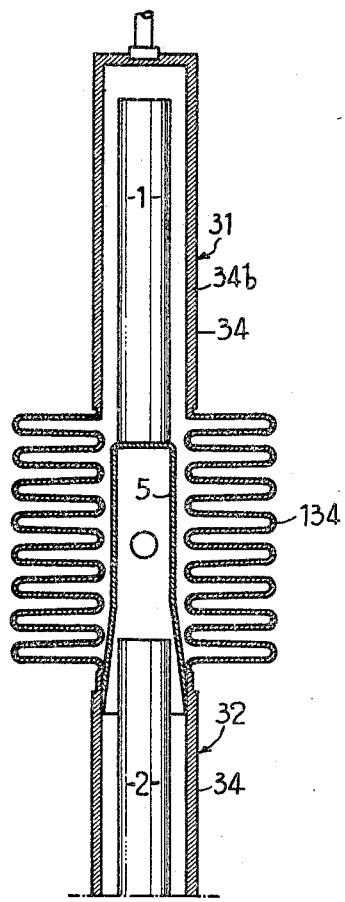

Gilbert Lazare-Chopard, Morangis, and René Merard, Massy, France, assignors to Commissariat à l'Energie Atomique, Paris, France, a corporation of France
Filed June 8, 1965, Ser. No. 462,313
Claims priority, application France, June 9, 1964, 977,516
8 Claims. (Cl. 310—4)

A thermoelectronic energy converter is already known comprising elementary nuclear fuel bars mounted in a common cylindrical anode and individual connected to the latter, said anode being coaxial with the composite bar thus formed and formed by elementary cylindrical anodes connected by connections in the form of rings having in the axial direction a linear resistance greater than that of said elementary anodes.

For this purpose, these connections are composed of alloys or pure metals haivng a sufficiently high electric resistivity and moreover, these alloys or metals are employed rather thin so that the electrical resistance of the rings in high enough to reduce the shunted current to a low value, for example at the most equal to $\frac{1}{10}$ of the total current.

The object of the present invention is to improve this device by increasing the resistance of these anode-anode connections while employing therefor metals having resistivities and thicknesses of conventional type.

For this purpose, according to the main feature of the invention, there is employed in each gap between two elementary anodes a connection having a length which is much greater than that of this gap.

This great length can be obtained by employing a folded metal membrane.

In the case of cylindrical anodes, this membrane consequently has the shape of a surface of revolution in which the generating curve has a length which is much greater than that of the rectilinear generatrices of the cylinders employed, and preferably this surface has in axial section the shape of a curve having numerous corrugations and in which the valve of the ratio:

$$R = \frac{\text{radial length}}{\text{pitch}}$$

is a high as possible.

Further features and advantages of the invention will be apparent from the ensuing description with reference to the accompanying drawing to which the invention is in no way limited.

The annexed drawing shows diagrammatically in axial section a portion of a thermoelectronic energy converter of the general type comprising the anode-anode connection improved in accordance with the present invention.

In the illustrated embodiment, the converter comprises a series of diodes such as 31, 32 . . . etc., each diode comprising in particular a nuclear fuel bar such as 1, 2 . . ., and the assembly has a common anode 34 including portions 34b of normal thickness separated by connections which are cylindrical and thin. Each of the bars is connected to the following elementary anode by a base 5 which is surrounded by the corresponding connection.

In the illustrated embodiment, these connections or connecting means comprise a metal membrane or diaphragm 134 which is pleated or folded in the form of a bellows. As the anodes are cylindrical this membrane has the shape of a surface of revolution whose generatrix has the shape shown diagrammatically in the drawing, namely: that of a pleated bellows having numerous corrugations the radial extent of which is great relative to the pitch of the corrugations of the membrane, that is, relative to the distance between two maxima or crests of the pleated bellows.

This connection is composed of industrially conventional metals having sufficient resistivity, for example of the order of $1$–$1.2 \times 10^{-4}$ ohm cm./sq. cm. Stainless steel having a thickness of 0.1 mm. could be suitable for this purpose; other metals or alloys having a sufficiently high resistivity, such as certain Fe-Al alloys, could also be suitable.

This membrane can in particular be obtained from commercially available corrugated rings; however, it is necessary to flatten axially these corrugations so as to increase their ratio:

$$\frac{\text{radial length}}{\text{pitch}}$$

and thus increase the ratio:

$$\frac{\text{developed length}}{\text{apparent length}}$$

of the membrane.

Let it be supposed, for example, that the starting material is a corrugated tubular membrane of size 60×40 (outside and inside diameters in millimetres), the corrugations having a pitch of 4 mm., the radial height or height or extent of the corrugations being 10 mm. relative to the geometric cylinder encompassing the inner maxima or roots of the corrugations of the membrane. Without taking into account the end connections, the apparent length of this membrane is 52 mm. extending over 13 pitches. The real developed length is roughly equal to $52 + 13 \ (60-40) =$ approximately 310 mm. The resistance of such a membrane is therefore multiplied by a correcting factor in the region of 6 relative to a rectilinear membrane having the length 52 mm. and composed of the same metal.

Further, in longitudinally flattening the corrugations, it is possible to reduce the length from 52 mm. to 13 mm, the correcting factor being then in the region of 24. This improvement therefore permits considerably increasing the linear resistance of the connections.

In the case of the example given hereinbefore of a membrane having an apparent length of 5 cm. and a real length of $5 \times 24 = 120$ cm., a thickness of $\frac{1}{10}$ mm. and a resistivity of $10^{-4}$ ohms. cm./sq. cm., there is obtained a resistance of about $8 \times 10^{-2}$ ohm. If the electric voltage is 0.8 volt, the shunted current in the membrane is equal to 10 A. In respect of a diode delivering 200 A. this shunted current represents only 5% of the total current.

Although specific embodiments of the invention have been described, many modifications and changes may be therein without departing from the scope of the invention as defined in the appended claims.

Having now described our invention what we claim as new and desire to secure by Letters Patent is:

1. Thermoelectronic energy converter comprising elementary nuclear fuel bars constituting a composite bar, a single continuous elongated cylindrical anode structure encompassing the composite bar and coaxial with the composite bar the anode structure comprising axially spaced elementary cylindrical anodes, and relatively thin annular pleated metal connecting means interconnecting the elementary anodes, the connecting means having in the axial direction a linear resistance exceeding that of the elementary anodes, and each connecting means having a developed length which is much greater than the spacing between adjacent elementary anodes, the elementary bars being individually electrically connected to the elementary anodes.

2. Thermoelectronic energy converter comprising elementary nuclear fuel bars constituting a composite bar, a single continuous elongated cylindrical anode structure encompassing the composite bar and coaxial with the composite bar the anode structure comprising axially spaced elementary cylindrical anodes, and relatively thin annular pleated metal connecting means interconnecting the elementary anodes, the connecting means having in the axial direction a linear resistance exceeding that of the elementary anodes, each connecting means being a tubular membrane having a wall folded in the form of a bellows and consequently having a developed axial length which is much greater than the spacing between adjacent elementary anodes and much greater than the apparent axial length of the wall, the elementary bars being individually electrically connected to the elementary anodes.

3. Thermoelectronic energy converter comprising elementary nuclear fuel bars constituting a composite bar, a single continuous elongated cylindrical anode structure encompassing the composite bar and coaxial with the composite bar the anode structure comprising axially spaced elementary cylindrical anodes, and relatively thin annular pleated metal connecting means interconnecting the elementary anodes, the connecting means having in the axial direction a linear resistance exceeding that of the elementary anodes, and each connecting means having a length which is much greater than the spacing between adjacent elementary anodes, the anodes being circular cylinders and the connecting means having the shape of a surface of revolution whose generatrix is curved and whose length is much greater than that of a rectilinear generatrix, the elementary bars being individually electrically connected to the elementary anodes.

4. Converter as claimed in claim 3, wherein said curved generatrix is a corrugated curve whose ratio $$\frac{\text{radial extent of the corrugations}}{\text{pitch of the corrugations}}$$

is high.

5. Converter as claim in claim 2, wherein the coefficient $$\frac{\text{developed length}}{\text{apparent length}}$$

of the membrane has a high value.

6. Converter as claimed in claim 5, wherein said value is of the order of several tens.

7. Converter as claimed in claim 1, wherein the connecting means is composed of stainless steel.

8. Converter as claimed in claim 1, wherein the connecting means is composed of a metal having a high electrical resistivity.

No references cited.

MILTON O. HIRSHFIELD, *Primary Examiner.*

J. W. GIBBS, *Assistant Examiner.*